United States Patent [19]
Girard

[11] 3,815,516
[45] June 11, 1974

[54] CONTAINER LOCK

[75] Inventor: Robert R. Girard, Saint Charles, Mo.

[73] Assignee: ACF Industries, Incorporated, New York, N.Y.

[22] Filed: Sept. 29, 1972

[21] Appl. No.: 293,456

[52] U.S. Cl....... 105/366 C, 105/366 D, 248/119 R
[51] Int. Cl............................ B65j 1/22, B61d 45/00
[58] Field of Search.................... 105/366 C, 366 D; 248/119 R, 361 R; 280/179 R; 296/35 A; 214/38 C, 38 D

[56] References Cited
UNITED STATES PATENTS

| | | | |
|---|---|---|---|
| 1,570,288 | 1/1926 | Smith | 105/366 C |
| 2,424,429 | 7/1947 | Bamberg | 105/366 C |
| 3,399,921 | 9/1968 | Trost et al. | 105/366 C |
| 3,604,364 | 9/1971 | Sweger | 105/366 C |

*Primary Examiner*—Drayton E. Hoffman
*Attorney, Agent, or Firm*—Henry W. Cummings

[57] ABSTRACT

A container locking device is disclosed for locking containers in place in transportation vehicles comprising a weighted base portion and a generally vertically extending web portion extending from the base portion. The web portion has a generally horizontally extending locking arm and above the locking arm means for pivotally mounting the locking device on a transportation vehicle, for example, one or more openings extending all or part way through the web portion. The locking device cooperates with a container whose lower portion has a mounting opening therein. As the container descends toward locking position in the vehicle, the lower portion of the container cams the locking arm about the pivot mounting means until the locking opening in the container is reached, when the locking arm automatically snaps into the opening. The containers are removed by manually rotating the locking arm about the pivot point to an elevated position which allows unobstructed removal of the containers. The lock is contoured so that an operator can easily determine if the locking arm is properly in place. Means may be provided on the container to automatically move the locking device from the elevated position to the locking position.

16 Claims, 10 Drawing Figures

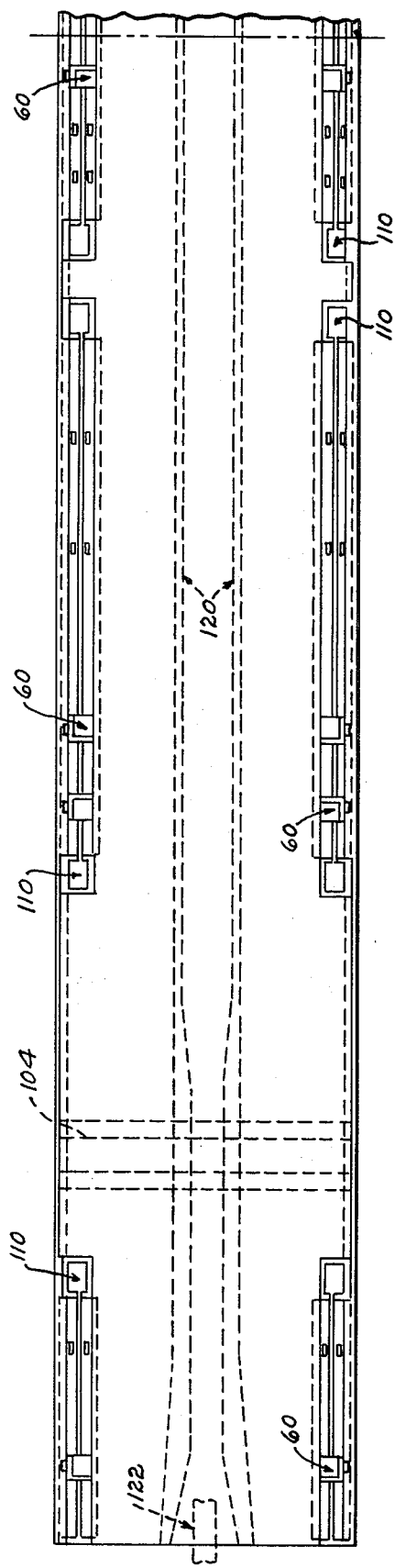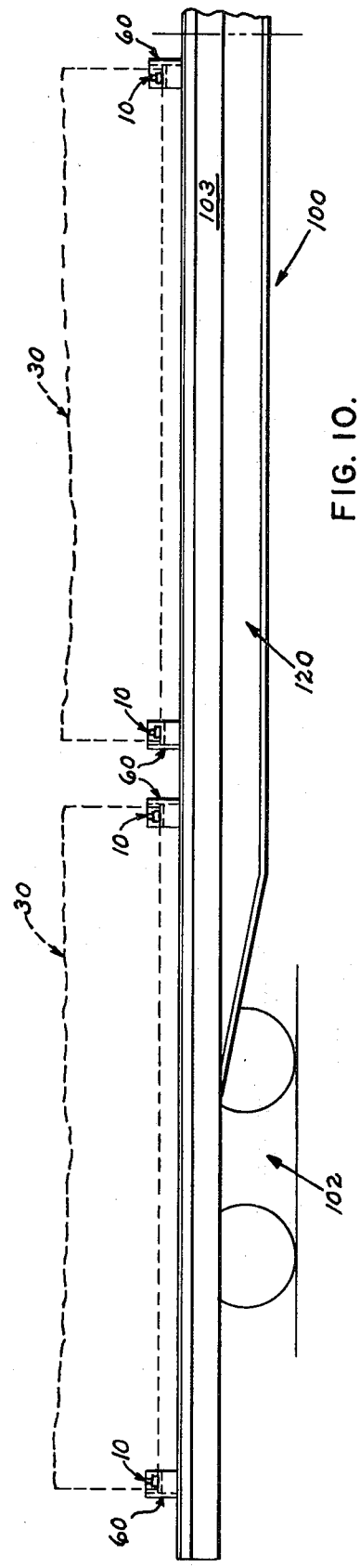

CONTAINER LOCK

BACKGROUND OF THE INVENTION

Containers are utilized to carry a wide variety of ladings in transportation vehicles including railroad cars, ships, and overland vehicles. Securement of such containers is important during transit because often in transit impacts on the containers occur from a variety of sources, for example, in a railroad car, the coupling and uncoupling of other cars; in overland vehicles, bumps and sudden stops; and in ships, high wind and waves, and in docking of the ship.

Many, if not most, transportation containers are provided with a connecting portion for attachment to the transportation vehicle. Often this takes the form of a base portion having an opening therein for engagement with a locking device on the transportation vehicle. Such base portions are often called feet and frequently are made of castings.

In order to avoid damage to the lading during transit, it is important that the locking device be positively locked to insure that the containers cannot come unlatched during transit, particularly during impacts such as those described above. Also, the locking means should be easy to apply and take only a short application time. It is also desirable that the lock be readily checked by an operator to determine if it is in the locked position. It is further advantageous if the locking device is self-locking, or locking upon contact with a container being lowered into place. It is also desirable if the locking device is self priming, i.e. it does not require an operator to move the locking device out of the way of the container when the container is lowered into position on the transportation vehicle.

It therefore is an object of the present invention to provide a container lock which will reduce or eliminate dislodgement of the container during transit.

It is another object of the present invention to provide a locking device which is locked and unlocked easily and quickly.

Another object of the present invention is to provide a locking device which is readily checked as to whether or not the device is in the locked position.

Another object of the present invention is to provide a locking device which is self locking when the container is lowered into position.

Another object of the present invention is to provide a locking device in which the container automatically moves the lock into the locking position as it is lowered into place.

Other objects will be apparent from the following description and drawings.

THE DRAWINGS

FIG. 9 is a plan view of a railroad car which may be utilized in conjunction with the locking device of the present invention; and FIG. 10 is a side elevation view illustrating the use of the locking device of the present invention in conjunction with containers mounted on the car shown in FIG. 9.

Figure 1:
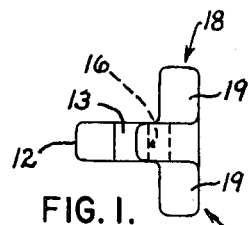
FIG. 1 is a top view of the locking device according to the present invention.
Figures 2, 3:
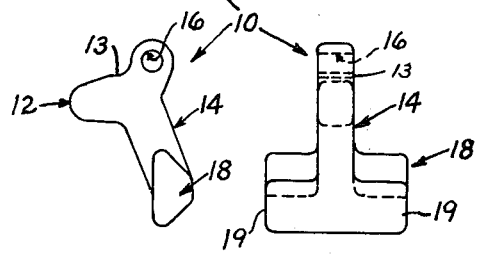
FIG. 2 is a side elevation view of the locking device according to the present invention.
FIG. 3 is an end elevation view of the locking device according to the present invention.

As shown in FIGS. 1–3, the locking device of the present invention is indicted generally at 10 and comprises a locking arm or nose 12 extending from an elongated web portion 14. Means for mounting the locking device on a transportation vehicle are provided in the upper part of the web portion, for example, one or more openings 16 extending all or part way through the portion. The web portion could also be provided with extensions having mounted means therein, if desired. The locking device further comprises a weighted base portion 18, for example, containing spaced apart weighted arms 19.

Figure 5:
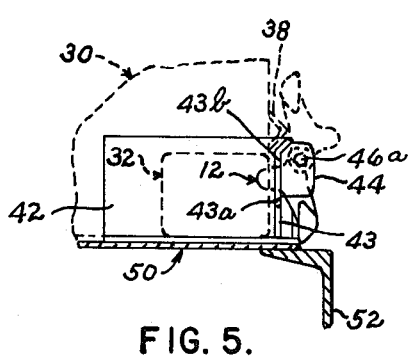
FIG. 5 is a view along the line 5—5 of FIG. 4.
Figure 4:
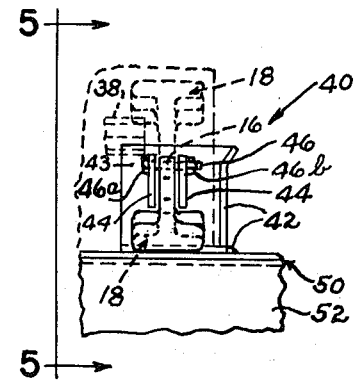
FIG. 4 is a side elevation view of a locking device of the present invention used in conjunction with mounting of a container on the floor or deck of a transportation vehicle.

As shown in FIGS. 4 and 5, the locking device 10 is mounted upon a transportation vehicle with support means indicated generally at 40 and comprising a plate 42 affixed, for example, by welding to a deck or flooring of the transportation vehicle 50. Plate 42 is utilized to hold the container in place. Welded or otherwise affixed to plate 42 is a support plate 43 upon which locking device 10 is mounted. Lock support members 44 are appropriately affixed, for example, by welding to support plate 43. A pivot pin 46 held in place with appropriate fasteners 46a and 46b passes through lock support members 44 and through opening 16 in locking device 10 for pivotal movement of locking device 10 about pin 46. Plate 43 has an opening 43a through which locking arm 12 passes to engage a portion of the container in locking position.

A container is indicated generally at 30 which may be of any desired shape, for example, rectangular having base portions or feet 32 which are hollow which may be a cast or formed shape having an opening 34 and a lower ledge 36.

Figure 6:
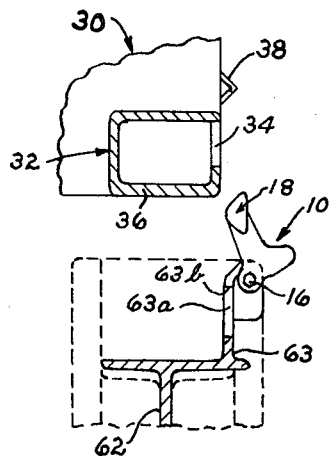
FIG. 6 is a view of the locking device of the present invention as a container is about to be lowered into position.
Figure 7:
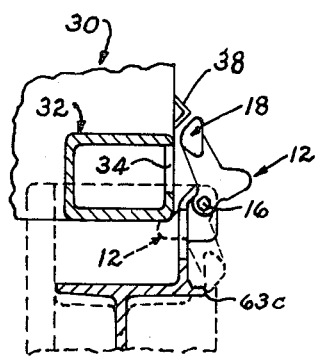
FIG. 7 is a view of a container being lowered into position illustrating a bottom portion of the container engaging the locking arm of the locking device of the present invention.
Figure 8:
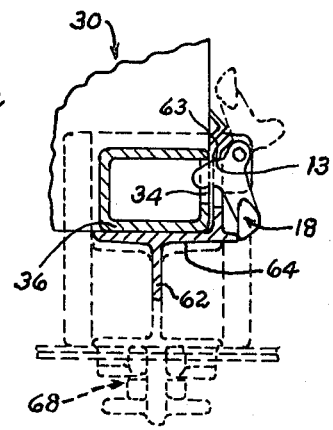
FIG. 8 is a view of a container being held in place by the locking device of the present invention and illustrating in dotted form the locking device in the elevated position.

FIGS. 6–8 illustrate the operation of the locking device of the present invention. When a container is to be lowered into position, the locking device will often be in the upright position shown in FIG. 6 with the base portion 18 moved above pivot pin 16 and locking member 12 pointing in a direction away from the container. This is the normal position of locking device 16 after a previous container has been removed. As the container is lowered, if the locking member is in the position shown in FIG. 6, the container will generally hit the base portion 18. This can be done deliberately by an operator lowering the container into place by means of a crane. For example, moving container 30 in a direction at least partially left to right in FIG. 6 during descent will cause locking member 10 to rotate about the pivot point 16 and assume the position shown dotted in FIG. 7 with locking arm 12 positioned inwardly. Alternatively, a projection 38 may be provided on the container to insure engagement of base portion 18 by part of the container.

As the container descends further, ledge 36 of foot 32 contacts locking member 12 as shown in FIG. 7 and causes the same to pivot outwardly about the pivot point 16 until such time as ledge 36 has passed by the locking member 12. At this point the locking member 12 will move back into the opening 34 as shown in FIG. 8 and hold the container in place.

It will be noted in FIGS. 1-3 that the locking arm 12 contains a substantially horizontal portion 13. This portion engages a substantially horizontal portion 43b of plate 43 in FIG. 4 or horizontal portion 63b of mounting means 60 shown in FIGS. 6-8. Thus if container 30, due to impact or other forces, is urged upwardly against gravity, the ledge 36 will urge locking member 12 upwardly but this movement will be resisted by the horizontal portions 13 and respectively 43b or 63b or 63c insuring that the container cannot move from the respective locking positions. Base portion 18 is sufficiently weighted to insure that due to impact or other forces the locking member will not assume the elevated position shown dotted in FIGS. 5 and 8. Preferably base portion 18 comprises substantially identical weighted arms 19.

When it is desired to remove the containers, it is merely necessary to rotate locking member 10 about the pivot point 16 so that it assumes the elevated position illustrated in FIG. 6. Then the container may be lifted, for example, by a crane unobstructed during its exit from the locking position on the transportation vehicle.

It will be noted at this point that the locking member will normally be in a position shown in FIG. 6 after a container has been removed from the locking means because this is the only position in which a container may be removed from the locking means. However, for one reason or another, when the container descends the locking means may be in a position shown in dotted lines in FIG. 7. This will be the case, for example, if the locking member has been contacted by a portion of the container and the locking member rotated about the pivot point 16 as described above, or if the locking device has been intentionally or unintentionally moved from the position shown in FIG. 6, in which case the locking device may assure the position shown dotted in FIG. 7.

In this connection, if the containers 30 do not contain projections to engage base portion 18 during descent, it may be preferred for the operator to manually rotate the locking device to the position shown dotted in FIG. 7 prior to lowering the containers to be locked in place.

It will be noted that the position of the locking means is easily ascertained by the operator. In the unlocked elevated position, locking arms 12 extend outwardly and base portion upwardly as shown in FIG. 6. If the containers are in place and the locking arm properly in place, there will be no outward projection of locking arm 12 or upward projection of base 18. On the other hand, if a container is in place and base portion 18 and/or locking arm 16 projects outwardly, as might occur, for example, if locking arm 12 did not snap back into container opening 34, it will be clear to the operator that the locking device is not in place and he should lock the container in place.

FIGS. 4 and 5 illustrate the locking device used in conjunction with the floor or deck mounting of the container. Plate 42 is welded or otherwise affixed to the deck or flooring structure 50. As an example, the transportation vehicle may be a railroad car having a side sill 52.

The embodiment shown in FIGS. 6-8 illustrates pedestal mounting means 60 wherein a pedestal support member 62 has a container mounting member 64 and mounting member 63 upon which locking device 10 is mounted. Mounting member 63 has an opening 63a through which locking arm 12 passes to engage a container 30, and substantially horizontal portion 63b which cooperates with horizontal portion 13 of arm 12 to prevent the containers from unlocking.

The pedestal support means may be mounted on a transportation vehicle such as a railroad car deck by means known in the art. One method is described in Grob et al U.S. Pat. No. 3,391,654, assigned to the same Assignee as the present application, and which is hereby incorporated into the present application by reference.

FIGS. 9 and 10 illustrate containers 30 mounted upon a railroad car 100 having a truck 102 including a bolster 104, a center sill 120 and a coupler structure 122. Pedestal supports 60 are provided which are illustrated in FIGS. 6-8 including support structure 68 (FIG. 8) mounted within the car deck adjacent side sill 103 to support pedestal support 62. The pedestals 60 with locking means 10 thereon are movable from the operative position shown in FIG. 8 to an inoperative position in openings 110 as described in detail in the said Grob et al. patent, for example, in the paragraph bridging cols. 3 and 4.

Thus, among the many applications for which the locking device of the present invention is suited is the TOFC-COFC or convertible car currently being utilized in the railroad industry.

What is claimed is:

1. A container locking device comprising:
a weighted base portion;
a web portion extending from said base portion;
said web portion having integral therewith a generally horizontally extending locking arm having a cammed surface adapted to be engaged by a container while being lowered into a locked position;

means on said web portion located above said locking arm for pivotally mounting the locking device about a generally horizontal axis on a generally vertical surface of a transportation vehicle having an opening in said vertical surface below said horizontal axis; said locking device having a locking position wherein said base portion is located below said horizontal axis and said locking arm extends inwardly through said opening, and wherein when a container is lowered into position for locking, a lower portion of the container engages said cammed surface and displaces the arm about said horizontal axis until the arm enters an opening in the lower portion of the container to lock the same in place and hold the same on the transportation vehicle; and an open position wherein said locking arm extends away from said vertical surface and said container can be removed from the vehicle, and wherein said base portion is located above said horizontal axis and extends in a direction at least partly inwardly and perpendicular to said surface and is adapted to be contacted by a descending container whereby said locking device will pivot about said horizontal axis and assume said locking position.

2. A locking device according to claim 1 wherein said base portion comprises two weighted arms extending from said web portion.

3. A locking device according to claim 2 wherein said weighted arms are substantially identical in configuration.

4. A locking device according to claim 1 wherein said locking arm has a substantially horizontal locking surface engaging the transportation vehicle upon which said locking member is mounted.

5. A locking device according to claim 1 wherein the portion of the transportation vehicle upon which said locking member is mounted is the deck of a transportation vehicle.

6. A locking device according to claim 1 wherein the portion of the transportation vehicle upon which said locking member is mounted is a pedestal mounted on a transportation vehicle.

7. A locking device according to claim 6 wherein the portion of the transportation vehicle upon which said locking device is mounted is movable into a stored position below the deck.

8. A container locking device comprising:
a weighted base portion;
a web portion extending from said base portion;
said web portion having integral therewith a generally horizontally extending locking arm having a cammed surface adapted to be engaged by a container while being lowered into a locked position;

means on said web portion located above said locking arm for pivotally mounting the locking device about a generally horizontal axis on a generally vertical surface of a railroad car having an opening in said vertical surface below said horizontal axis;
said locking device having a locking position wherein said base portion is located below said horizontal axis and said locking arm extends inwardly through said opening, and wherein when a container is lowered into position for locking, a lower portion of the container engages said cammed surface and displaces the arm about said horizontal axis until the arm enters an opening in the lower portion of the container to lock the same in place and hold the same on the railroad car; and an open position wherein said locking arm extends away from said vertical surface and said container can be removed from the railroad car; and wherein said base portion is located above said horizontal axis and extends in a direction at least partly inwardly and perpendicular to said surface and is adapted to be contacted by a descending container whereby said locking device will pivot about said horizontal axis and assume said locking position.

9. A container locking device according to claim 8 wherein said base portion comprises weighted arms extending from the lower portion of said web portion.

10. A locking device according to claim 8 wherein said weighted arms are substantially identical in configuration.

11. A locking device according to claim 9 wherein said locking arm has a substantially horizontal locking surface adapted to engage a substantially horizontal locking surface on the railroad car upon which said locking member is mounted.

12. A locking device according to claim 8 wherein the portion of the railroad car upon which said locking member is mounted is the deck.

13. A locking device according to claim 8 wherein the portion of the railroad car upon which said locking member is mounted is a pedestal on the railroad car.

14. A locking device according to claim 13 wherein the portion of the railroad car upon which said locking device is mounted is movable into a stored position below the deck of the car.

15. A container locking assembly comprising:
a container comprising a foot portion having an opening therein;
a container locking device comprising a weighted base portion;
a web portion extending from said base portion;
said web portion having integral therewith a generally horizontally extending locking arm having a cammed surface adapted to be engaged by said container while being lowered into a locked position;
means on said web portion located above said locking arm for pivotally mounting the locking device about a generally horizontal axis on a generally vertical surface of a transportation vehicle having an opening in said vertical surface below said horizontal axis; said locking device having a locking position wherein said base portion is located below said horizontal axis and said locking arm extends inwardly through said opening in said vertical surface and wherein when said container is lowered into position for locking, the foot portion of the container engages said cammed surface and displaces the arm about said horizontal axis until the arm enters the opening in the foot portion of the container to lock the same in place and hold the same on the transportation vehicle; and an open position wherein said locking arm extends away from said vertical surface and said container can be removed from the vehicle, and wherein said base portion is located above said horizontal axis and extends in a direction at least partly inwardly and perpendicular to said surface and is adapted to be contacted by means on said container to engage said locking device whereby said locking device will pivot about said horizontal axis and assume said locking position.

16. A locking assembly according to claim 15 wherein projections are provided on said container to engage the locking device when the same is in the elevated position as the container descends to assume the locked position.

* * * * *